(12) United States Patent
Schmidt et al.

(10) Patent No.: US 7,098,836 B2
(45) Date of Patent: Aug. 29, 2006

(54) SIGNAL-PROCESSING DEVICE WITH REAL-TIME AND REPROCESSING OPERATING MODES

(75) Inventors: Kurt Schmidt, Grafing (DE); Markus Freidhof, Kirchseeon (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 11/102,957

(22) Filed: Apr. 11, 2005

(65) Prior Publication Data

US 2005/0242981 A1    Nov. 3, 2005

(30) Foreign Application Priority Data

Apr. 23, 2004   (DE) .................. 10 2004 019 967

(51) Int. Cl.
*H03M 1/12* (2006.01)
(52) U.S. Cl. .................................... 341/155
(58) Field of Classification Search ............... 341/155, 341/61, 143, 122, 165, 185; 711/118
See application file for complete search history.

(56) References Cited

U.S. PATENT DOCUMENTS

| | | | |
|---|---|---|---|
| 5,471,411 A | 11/1995 | Adams et al. | 364/724.01 |
| 5,566,101 A | 10/1996 | Kodra | 364/724.16 |
| 6,333,708 B1 | 12/2001 | Hungerbuehler et al. | 341/155 |
| 6,542,963 B1 * | 4/2003 | Lee | 711/118 |

FOREIGN PATENT DOCUMENTS

| | | | |
|---|---|---|---|
| EP | 418 439 B1 | 3/1991 |
| EP | 629 044 B1 | 12/1994 |
| EP | 729 266 B1 | 8/1996 |

OTHER PUBLICATIONS

Search Report in DE 10 2004 019 967.1 dated Jan. 26, 2005.

* cited by examiner

*Primary Examiner*—Peguy JeanPierre
(74) *Attorney, Agent, or Firm*—Marshall, Gerstein & Borun LLP

(57) ABSTRACT

A signal-processing device includes an analog-to-digital converter for the generation of a digital input signal from an analog input signal, an intermediate memory for the intermediate storage of the digital input signal and a digital signal-processing unit for the digital processing of the digital input signal. The signal-processing unit can be switched by means of a switching device in such a manner, that the signal-processing unit is series-connected optionally either to the intermediate memory or, by-passing the intermediate memory, to the analog-to-digital converter.

9 Claims, 5 Drawing Sheets

SIGNAL-PROCESSING DEVICE WITH REAL-TIME AND REPROCESSING OPERATING MODES

BACKGROUND

1. Field of the Disclosure

The disclosure relates to a signal-processing device particularly suitable for use in high-frequency measuring technology, e.g. for the evaluation of mobile telephone signals.

2. Related Technology

One problem in the realization of measuring devices for message signals for various telecommunication standards, especially for mobile telephone systems, is that some applications require an evaluation in real-time, while in other applications, an evaluation in real-time is not possible, because of the high data rate and the limited resources of the digital processing unit. In this case, reprocessing is required.

EP 0 629 044 B1 discloses a signal-processing device, specifically applicable to image processing for digital cameras. The image recording takes place via a rapid analog-to-digital converter, and the image data generated in this context are stored in an intermediate memory. To provide a zoom function, interpolations between the individual pixels must be carried out in order to generate intermediate pixels. These interpolations take place not in real-time, but at a processing rate determined by the interpolator, so that the clock-pulse rate, at which the data are read out of the intermediate memory is lower than the clock-pulse rate at which the image data are written to the intermediate memory. The interpolated data are made available in an output memory.

However, a disadvantage with the signal-processing device known from EP 0 629 044 B1 is that the data must always be placed into intermediate storage in the intermediate memory, even if no interpolation has to be carried out and/or even if only a rough interpolation has to be carried out for a few intermediate pixels, so that the processing can also take place in real-time. Because of the intermediate memory, which is always connected between the analog-to-digital converter and the interpolating signal-processing unit, the total processing time for the processing procedures, which can take place in real-time, is unnecessarily prolonged.

GENERAL DESCRIPTION

The disclosure further provides a signal-processing device having an analog-to-digital converter for generating a digital input signal from an analog input signal, an intermediate memory for intermediate storage of the digital input signal, and a digital signal-processing unit for digital processing of the digital input signal and for generating a digital output signal in such a manner that total processing time is reduced and the efficiency of signal processing is increased.

Accordingly, a switching device is provided, by means of which the signal-processing unit can be switched in such a manner that the signal-processing unit is series-connected optionally either to the intermediate memory, if this is required for the implementation of reprocessing or, alternatively, by way of by-passing the intermediate memory, to the analog-to-digital converter. In cases in which processing can take place in real-time, any unnecessary intermediate storage in the intermediate memory can therefore be avoided.

A resampler, which converts the sampling rate of the analog-to-digital converter to a desired sampling rate of the signal-processing unit, is advantageously connected upstream of the signal-processing unit. In the context of reprocessing, the signal-processing performance can be adapted by the resampler through a corresponding adjustment of the input clock-pulse rate of the signal-processing unit. In general, the reprocessing time is negligible by comparison with the remainder of the processing time. When reprocessing with a correspondingly adapted sampling rate, a high performance, e.g. steep-edge filter, can be achieved by doubling the clock-pulse number and the associated doubling of the tap count without noticeably increasing the total processing time.

In the context of reprocessing, it is particularly advantageous to increase the useful Nyquist band by means of "zero-stuffing" (insertion of zero-values into the sampling sequence).

Furthermore, it is advantageous to use a packer, which increases the word width of the data words of the digital input signal, for the data-bus connection between the analog-to-digital converter and the intermediate memory.

BRIEF DESCRIPTION OF THE DRAWINGS

An exemplary embodiment of the signal-processing device of the disclosure is described in greater detail below with reference to the drawings. The drawings are as follows.

DETAILED DESCRIPTION

Figure 1:
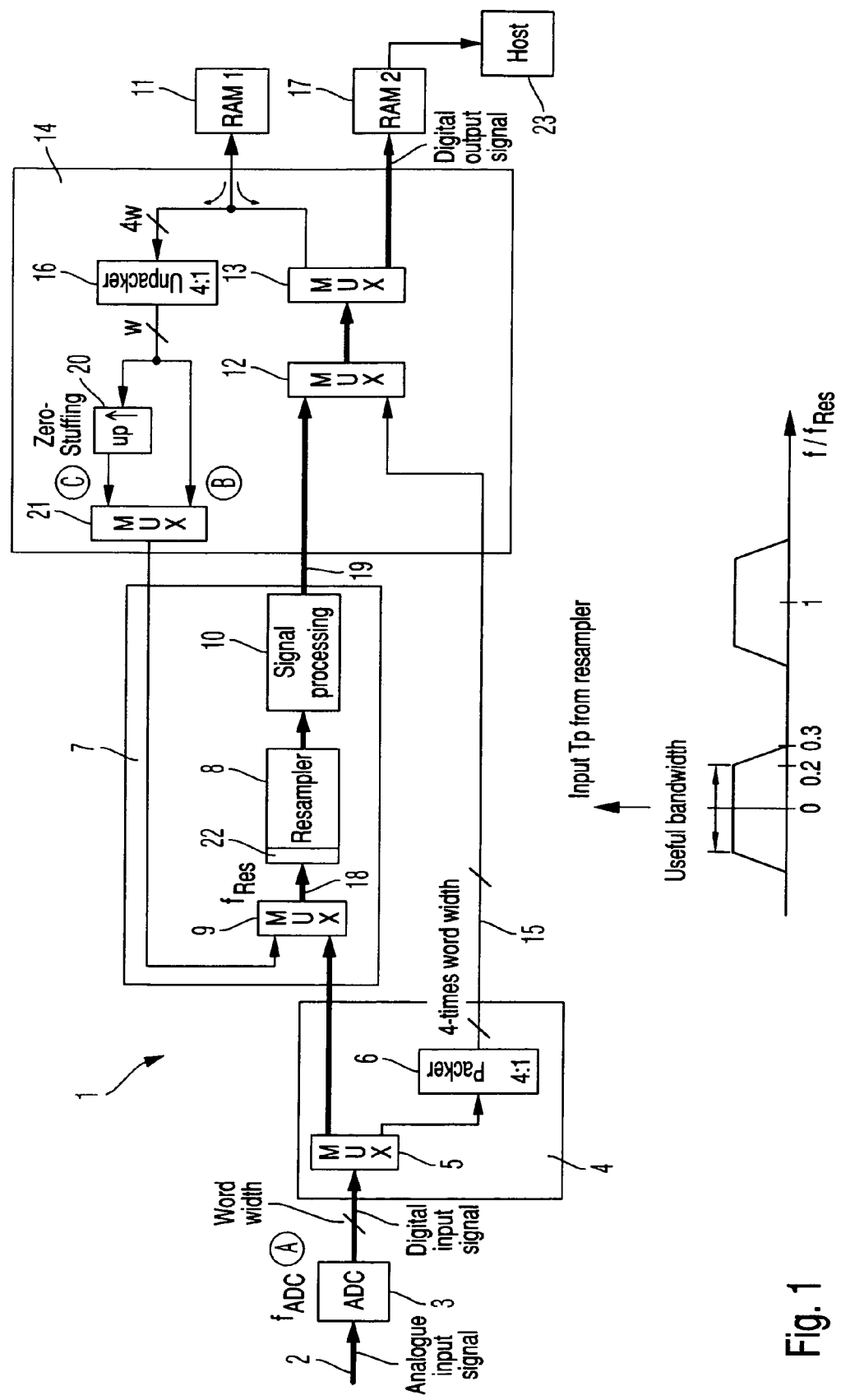
FIG. 1 shows a block circuit diagram of an exemplary embodiment of the signal-processing device of the disclosure in normal operating mode.

FIG. 1 shows the overall block circuit diagram of a signal-processing device 1 according to the disclosure. This arrangement allows real-time processing (normal operating mode) and also reprocessing. In general, the active signal paths are marked in the drawings with bold lines. In FIG. 1, the active signal paths are illustrated in the normal operating mode. At an input 2, the analog input signal $S_{AE}$ is sampled by an analog-to-digital converter 3 at a sampling rate $f_{ADC}$. The analog input signal $S_{AE}$ is present either in the baseband or in the intermediate-frequency (IF) position. In the case of baseband signals, two analog-to-digital converters (a real component I and an imaginary component Q) are necessary; for reasons of clarity of layout, only one analog-to-digital converter 3 is shown in FIG. 1.

The explanation below relates only to baseband signals. However, the subsequent description applies equally for intermediate-frequency processing. At the input of a resampler 8, it is only necessary to provide a mixer (NCO) for translation into the baseband.

The sampled sequence of the digital input signal $S_{DE}$ has the word width w and is initially passed to a signal-processing stage 4, which includes of a multiplexer 5 and a packer 6. Before the actual signal processing, the clock-pulse rate must be converted to the system-specific clock-pulse rate of the signal-processing unit. In the case of a data transmission, a whole-number multiple of the symbol rate is generally selected. This task is performed by a resampler 8. A signal processing stage 7 includes a multiplexer 9, the resampler 8, and a signal-processing unit 10.

In normal operating mode, the input clock-pulse rate $f_{Res}$ of the resampler 8 according to $$f_{Res} = f_{ADC}$$

is equal to the sampling rate of the analog-to-digital converter 3. In the resampler 8, a low-pass filtering is implemented before the actual sampling-rate conversion in an input low-pass filter 22. This is necessary, because otherwise aliasing effects would occur. FIG. 1 shows schematically the frequency response of an input low-pass filter 22. The passband in the example extends over $$|f/f_{Res}| \leq 0.2 \quad (1)$$

and the transition band extends over $$0.2 \leq |f/f_{Res}| \leq 0.3.$$

Using the low-pass filter 22 means that a non-band-limited signal can also be passed to the resampler 8. The useful spectrum of the input signal must merely be disposed within the passband of the input low-pass filter 22.

In the exemplary embodiment, the demodulation of the signal received is implemented in the signal-processing unit 10. At this stage, the signal-processing blocks such as the NCO (Numerical Controlled Oscillator), decimation filters, or signal-adapted FIR (Finite Impulse Response) filters are used. The calculated output sequence is then written to the signal-processing unit in an output memory 17 (RAM 2), to which the signal is supplied via multiplexers 12 and 13, which are arranged in a signal processing stage 14. As soon as the desired observation length is present in the output memory 17, the signal processing is halted, and the output memory 17 (RAM 2) is read out by a host computer 23. Following this, the real-time signal processing is restarted and the process described is repeated.

Figure 2:
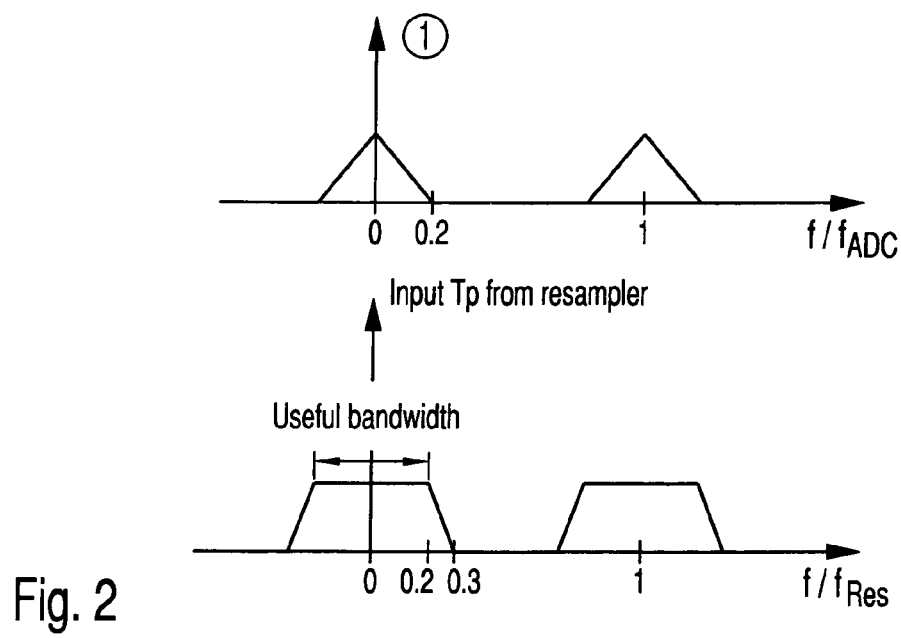
FIG. 2 shows the spectrum after the analog-to-digital converter by comparison with the passband width of the input low-pass filter of the resampler.

In the normal operating mode, the useful bandwidth is restricted by the maximum input clock-pulse rate max $f_{Res}$ of the signal processing. By way of visualization, FIG. 2 sketches the maximum useful bandwidth in the normal operating mode. The top half of the diagram in FIG. 2, shows the spectrum after the analog-to-digital converter 3 (see position A in FIG. 1). A triangular spectrum has been selected for clarity of illustration. Comparison with the frequency response of the input low-pass filter 22 of the resampler 8 in the bottom diagram shows that the input signal $S_{DE}$ fully exploits the available bandwidth. With a maximum input clock-pulse rate, for example, of max-$f_{Res}$=100 MHz, the maximum useful bilateral bandwidth is maxBW=40 MHz, that is to say, 40% of the Nyquist band is used. In general, the maximum useful bilateral bandwidth is:

$$\max BW = 2 \cdot 0.2 \cdot \max f_{Res} \quad (2)$$

The disclosure is based on the technical problem of increasing the useful bandwidth with given hardware. Using the concept of reprocessing, the useful bandwidth can be increased by a considerable factor. In this context, high-performance signal-processing hardware is used for reprocessing. The computing time increases somewhat by comparison with real-time processing, but the computing time required for reprocessing is generally considerably shorter than the time requirement for the other processes in the host computer 23; that is to say, from the perspective of the host computer 23, a quasi real-time processing is involved.

Figure 3:
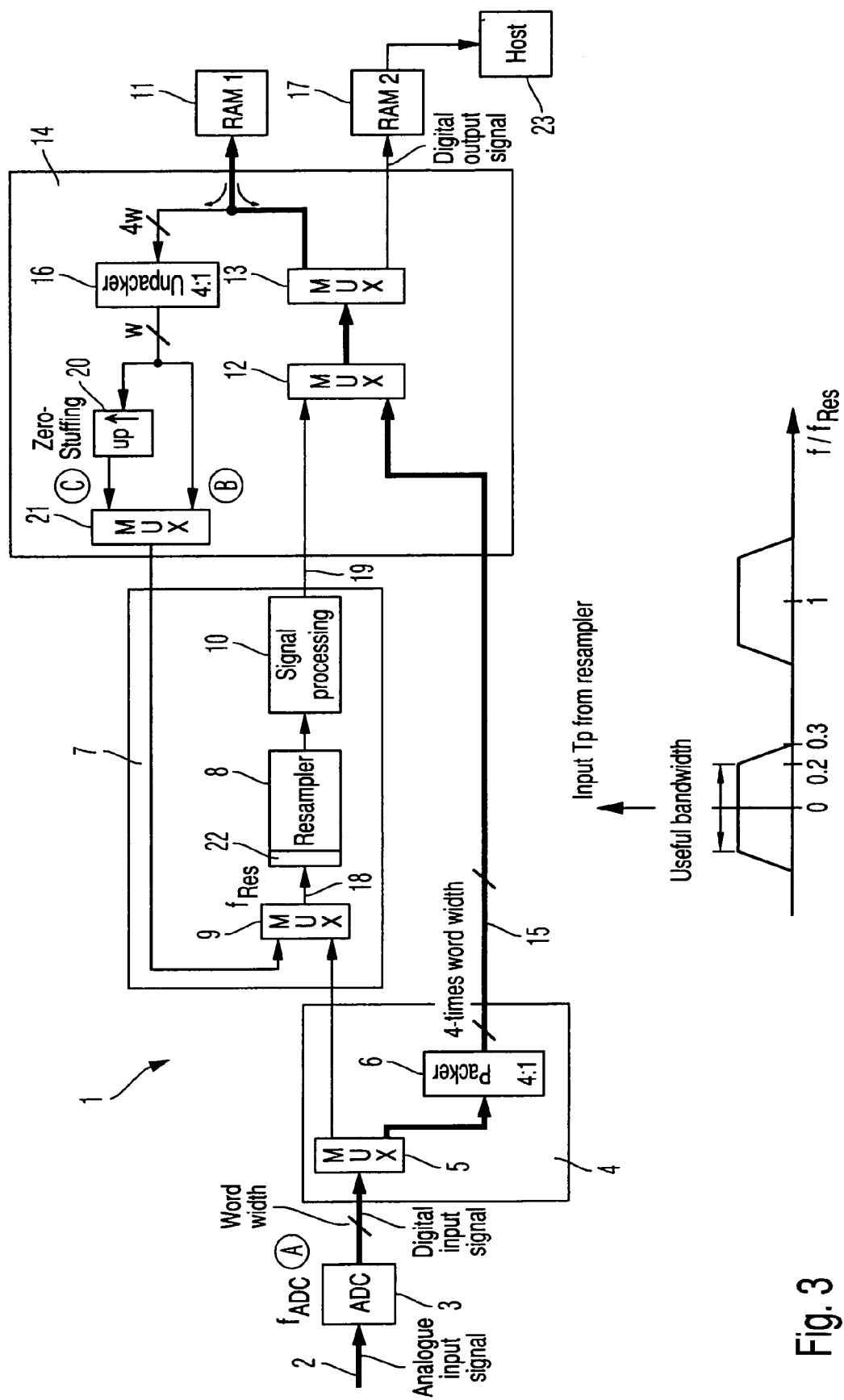
FIG. 3 shows the block circuit diagram illustrated in FIG. 1 in a first condition during reprocessing mode.

The individual stages of the method are described below. Initially, the sampling sequence is written to an intermediate memory 11 (RAM 1). FIG. 3 shows the active signal paths during writing to the intermediate memory 11 (RAM 1). The sampling rate $f_{ADC}$ of the analog-to-digital converter 3 must be selected to be adequately large, in order to achieve the desired useful bandwidth. In general, the sampling rate $f_{ADC}$ is greater than the maximum resampler input clock-pulse rate max $f_{Res}$. As a rule, the sampling words cannot be transmitted via a data bus 15 at the high analog-to-digital sampling rate, because the permitted rate is exceeded. Accordingly, the sampling words are passed to a packer 6 with the word width w. In the packer, four successive words, for example, are packed to form one word of word width 4w and then written to the intermediate memory 11 (RAM 1) via the data bus 15 at the word rate $f_{ADC}/4$, which is reduced by a factor of 4. After the desired observation period, the writing process to the intermediate memory 11 is interrupted.

Figure 4:
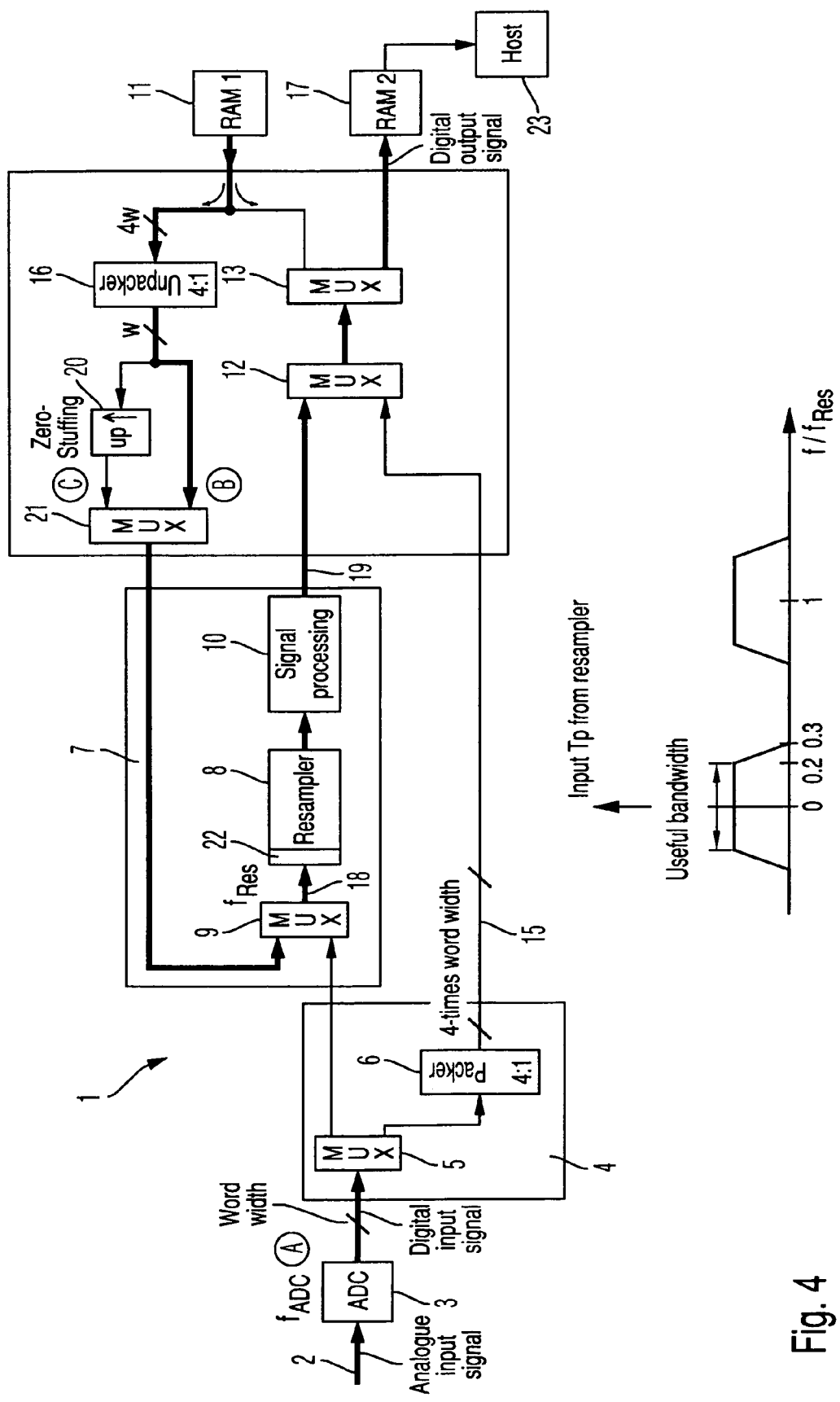
FIG. 4 shows the block circuit diagram illustrated in FIG. 1 in a second condition during reprocessing mode.

Subsequent reprocessing is illustrated in FIG. 4. Initially, the packed sampling values are unpacked in an unpacker 16 into the individual sampling values with the word width w. The unpacked sampling values are then read in by the resampler 8 via a multiplexer 9 at the predetermined input clock-pulse rate $f_{Res}$. After the passage through a signal-processing unit 10, the result sequence is written to an output memory 17 (RAM 2). Following this, the result sequence is read out by the host computer 23 from the output memory 17 (RAM 2).

One peculiarity of reprocessing is the potential interchangeability between performance and computing time. The method will be explained with reference to the example of a FIR filter as the signal-processing unit 10, wherein:

In the signal processing, an FIR filter with the output clock-pulse rate $f_{FIR\_out}$ is used.

The total Decimation Down between a resampler input 18 and an FIR output 19 is $$\text{Down} = \frac{f_{Res}}{f_{FIR\_out}} \quad (3)$$

The impulse response length of the FIR filter should be $nof_{Taps}$ samples long.

In the case of the direct realization of the FIR filter, $nof_{Taps}$ multipliers with the output clock-pulse rate $f_{FIR\_out}$ would be required. In order to save resources, only one multiplier is used, which operates at the system clock-pulse $f_{sys}$. The filter operates sequentially, that is to say, within one output clock-pulse period, a maximum of $f_{sys}/f_{FIR\_out}$ multiplications can be implemented. Accordingly, the available tap count is limited by the restriction:

$$nof_{Taps} \overset{!}{\leq} f_{sys}/f_{FIR\_out} \quad (4)$$

Using equation (4) in equation (3) leads to the following requirement for the input clock-pulse rate of the resampler 8

$$f_{Res} \overset{!}{\leq} f_{sys} \frac{\text{Down}}{nof_{Taps}} \quad (5)$$

The interpretation of equation (5) is as follows:

If a doubling of the tap count $nof_{Taps}$ is required in the reprocessing, the input clock-pulse rate of the resampler 8 must be halved. Furthermore, it is evident that the input clock-pulse rate of the resampler 8 can be doubled, if the down-sampling factor Down is doubled.

It has been shown with reference to the example, that in reprocessing, the signal-processing performance can be adapted by a corresponding adjustment of the input clock-pulse rate $f_{Res}$ of the resampler 8. In general, the reprocessing time is negligible by comparison with the remainder of the processing time. Accordingly, a high performance, for example, a steep-edge filter, can be achieved with the reprocessing concept by doubling the tap count without noticeably increasing the overall computing time. By contrast, with online implementation, a doubling of the tap count could only be achieved by doubling the number of multipliers, which would lead to an increase in the resource requirements, if at all available, and an increase in the peak-performance consumption of chips.

Figure 5:
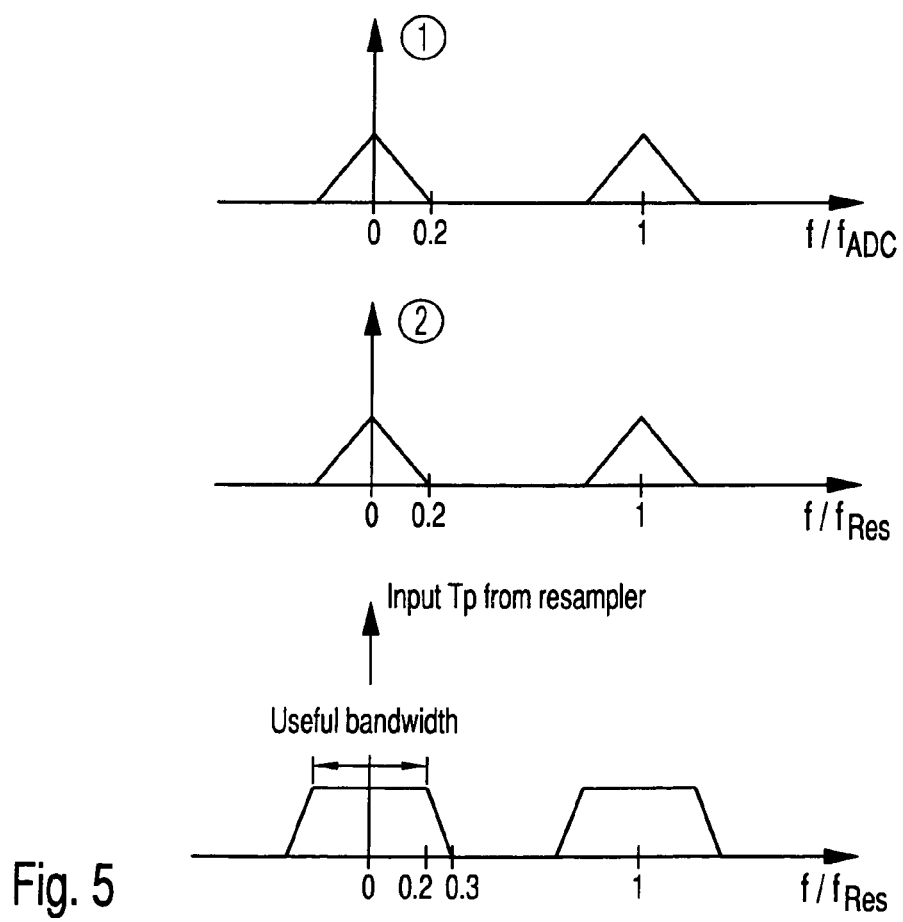
FIG. 5 shows spectra at different positions of the block circuit diagram according to FIG. 1 without "zero-stuffing;" and, FIG. 6 shows spectra at different positions of the block circuit diagram according to FIG. 1 with "zero-stuffing."

Corresponding to the online processing in FIG. 2, FIG. 5 shows the maximum useful bandwidth the reprocessing. The top diagram shows the spectrum after the analog-to-digital converter 3 (see position A in FIG. 4), and the middle diagram shows the spectrum after reading out from the intermediate memory 11 (RAM 1) (see position B in FIG. 4). The only difference between these two spectra is the different clock-pulse rates $f_{ADC}$ and $f_{Res}$ respectively. According to equation (2), the maximum useful bandwidth is therefore:

$$\text{Max}BW = 2 \cdot 0.2 \cdot \text{max} f_{ADC}, \quad (6)$$

That is to say, the useful bandwidth no longer depends upon the maximum input clock-pulse rate of the resampler 8, but rather on the maximum sampling rate of the analog-to-digital converter 3, which is generally considerably greater. With a maximum sampling rate, for example, of $\text{max} f_{ADC}=300$ MHz, the maximum useful bilateral bandwidth is maxBW=120 MHz, that is to say, the bandwidth in the example has been increased by a factor of 3 by comparison with online processing.

As illustrated below, the useful Nyquist band is enlarged in the case of reprocessing using the method of so-called "zero-stuffing." In the following example, an up-sampling by the upsampling factor up=2 is implemented, in other words, the clock-pulse rate is doubled after unpacking by inserting zeros (see position C in FIG. 4). The insertion of zeros is also referred to as "zero-stuffing" and is activated by a multiplexer 21 in the upper signal path after the unpacker 16, by switching the multiplexer 21 to an up-sampler 20, which inserts the zero-values.

Figure 6:
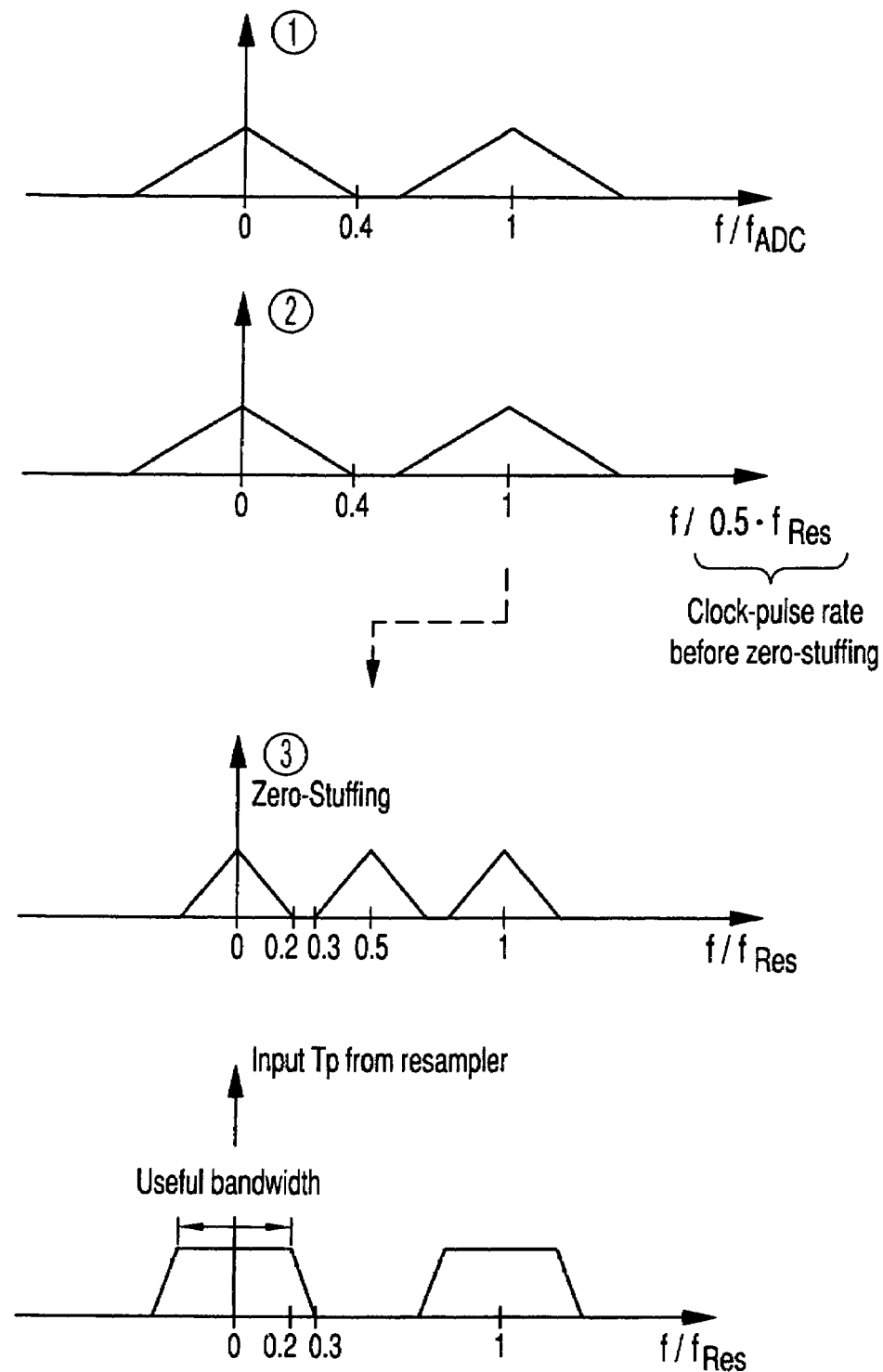

FIG. 6 shows the individual spectra. The top diagram shows the spectrum of the input signal. It is evident that the bandwidth has been increased by a factor of 2 to 80% of the Nyquist bandwidth (cf. FIG. 5). The diagrams below this illustrate that this spectrum, which is wider by a factor of 2, is processed without distortion. The second diagram from the top shows the spectrum before zero-stuffing (position B in FIG. 4), and the diagram below this shows the spectrum after zero-stuffing (position C in FIG. 4). As a result of zero-stuffing, the sampling rate has merely been doubled to the clock-pulse rate $f_{Res}$. No filtering is carried out in the case of zero-stuffing; that is to say, the spectrum is not altered. Accordingly, the first repeat spectrum after zero-stuffing appears at half the output clock-pulse rate.

Comparison with the input low-pass filter 22 of the resampler 8 in the bottom diagram shows that the first repeat spectrum is completely suppressed by the low-pass filter 22. Even if the spectral components were disposed in the transition band, this is not generally disturbing, because this band is suppressed by the signal-adapted filter in the subsequent signal-processing unit 10.

Accordingly, by comparison with equation (6), an increase in the bandwidth by a factor of 2 has once again been achieved:

$$\text{Max}BW = 2 \cdot 0.4 \cdot \text{max} f_{ADC}, \quad (7)$$

that is to say, in the case of reprocessing with zero-stuffing, 80% of the Nyquist band is used. With a maximum sampling rate, for example, of $\text{max} f_{ADC}=300$ MHz, a maximum useful bilateral bandwidth of maxBW=240 MHz is achieved, that is to say, the bandwidth has been increased by a factor of 6 by comparison with online processing.

By increasing the up-sampling factor to up=3, the entire Nyquist band of the input signal would be disposed in the passband of the low-pass filter 22. Indeed, in this case, part of the first repeat spectrum is also disposed in the passband. This repeat spectrum must be suppressed by the signal-adapted filter after the resampler 8 in the subsequent signal-processing unit 10.

In summary, the following can be stated: in the context of reprocessing, the entire 100% Nyquist bandwidth of the input signal can be analyzed in spite of the band-limited resampler 8. Naturally, this applies only asymptotically, because with 100% Nyquist bandwidth, an infinitely steep-edged, signal-adapted filter is required. This is achieved by the zero-stuffing method.

The disclosure is not restricted to the exemplary embodiment presented. For example, IIR filters or other digital signal-processing elements can be used in the signal-processing unit 10. All of the elements of the exemplary embodiment described can be combined with one another as required.

The invention claimed is:

1. Signal-processing device comprising:
   (a) an analog-to-digital converter for generating a digital signal ($S_{DE}$) from an analog input signal ($S_{AE}$);
   (b) an intermediate memory for intermediate storage of data indicative of the digital signal;
   (c) a digital signal-processing unit for generating a digital output signal ($S_{DA}$) based on the digital signal ($S_{DE}$); and,
   (d) a switching device to direct the digital signal to the digital signal-processing unit either via the intermediate memory or via a signal path by-passing the intermediate memory.

2. Signal-processing device of claim 1, further comprising a resampler, which converts a sampling rate $f_{ADC}$ of the analog-to-digital converter to a lower sampling rate $f_{Res}$ of the digital signal-processing unit, connected upstream of the digital signal-processing unit.

3. Signal-processing unit of claim 2, wherein the resampler comprises an input low-pass filter, of which a unilateral pass bandwidth is 0.2 to 0.3 of the sampling rate $f_{Res}$ of the digital signal-processing unit.

4. Signal-processing device of claim 1, further comprising an up-sampler for inserting a predetermined number of zero values between adjacent sampling values, wherein the up-sampler is disposed between the intermediate memory and the digital signal-processing unit.

5. Signal-processing device of claim 4, further comprising a further switching device, with which the up-sampler is bridged.

6. Signal-processing device of claim 1, further comprising a data bus to transfer the digital signal ($S_{DE}$) between the analog-to-digital converter and the intermediate memory with an enlarged word width and reduced transfer rate.

7. Signal-processing device of claim 6, further comprising a packer, which increases the an original word width of the data words of the digital signal ($S_{DE}$), disposed between the analog-to-digital converter and the intermediate memory.

8. Signal-processing device of claim 7, further comprising an unpacker, which restores the original word width of the data words of the digital signal ($S_{DE}$), disposed at an output of the intermediate memory.

9. Signal-processing device of claim 1, further comprising an output memory to transfer the digital output signal ($S_{DA}$) of the signal-processing unit to a host computer, with which the signal-processing device co-operates.

* * * * *